(12) United States Patent
Minezawa et al.

(10) Patent No.: US 10,120,352 B2
(45) Date of Patent: Nov. 6, 2018

(54) REMOTE CONTROL SYSTEM, IN-HOME DEVICE, RELAY APPARATUS, DEVICE MANAGEMENT METHOD, AND PROGRAM

(71) Applicant: Mitsubishi Electric Corporation, Tokyo (JP)

(72) Inventors: Satoshi Minezawa, Tokyo (JP); Hirotoshi Yano, Tokyo (JP); Masaaki Yabe, Tokyo (JP); Ichiro Maruyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 161 days.

(21) Appl. No.: 15/021,954

(22) PCT Filed: Nov. 14, 2013

(86) PCT No.: PCT/JP2013/080787
§ 371 (c)(1),
(2) Date: Mar. 15, 2016

(87) PCT Pub. No.: WO2015/071990
PCT Pub. Date: May 21, 2015

(65) Prior Publication Data
US 2016/0223997 A1    Aug. 4, 2016

(51) Int. Cl.
*G05B 15/02* (2006.01)
*H04L 12/28* (2006.01)
*G08C 17/02* (2006.01)

(52) U.S. Cl.
CPC ............. *G05B 15/02* (2013.01); *G08C 17/02* (2013.01); *H04L 12/283* (2013.01);
(Continued)

(58) Field of Classification Search
CPC .... G05B 15/02; G08C 17/02; G08C 2201/40; H04L 12/2816; H04L 12/2818; H04L 12/283
See application file for complete search history.

(56) References Cited

U.S. PATENT DOCUMENTS 7,164,956 B2 *   1/2007   Bicknell ................. G07F 9/026
                                                                           62/127
8,831,784 B2 *   9/2014   Wang ..................... G05B 15/02
                                                                           700/275
(Continued)

FOREIGN PATENT DOCUMENTS

CN          102692076 A      9/2012
JP          H04-170895 A      6/1992
(Continued)

OTHER PUBLICATIONS

Office Action dated Sep. 27, 2016 issued in corresponding JP patent application No. 2016-111461 (and partial English translation).
(Continued)

*Primary Examiner* — Abdelmoniem I Elamin
(74) *Attorney, Agent, or Firm* — Posz Law Group, PLC

(57) ABSTRACT

A remote control system (100) includes a home appliance (10) and a relay device (20, 30) for relaying transmission of an operation instruction for controlling the home appliance (10). The home appliance (10) includes a first detector for detecting a communication interruption on a first communication line (41, 42) for transmission of the operation instruction from the relay device (20, 30) to the home appliance (10), a receiver for receiving, from the relay device, an interruption signal indicating a communication interruption on a second communication line (42, 43) for transmitting the operation instruction from a communication device to the relay device (20, 30), and a state changer for changing a state of the home appliance in accordance with
(Continued)

a duration of at least one of the communication interruption detected by the first detector or the communication interruption indicated by the interruption signal. The relay device (20, 30) includes a second detector for detecting the communication interruption on the second communication line (42, 43), and a transmitter for transmitting the interruption signal to the home appliance (10) when the communication interruption is detected by the second detector.

14 Claims, 13 Drawing Sheets

(52) U.S. Cl.
CPC ...... *H04L 12/2816* (2013.01); *H04L 12/2818* (2013.01); *G08C 2201/40* (2013.01)

(56) References Cited

U.S. PATENT DOCUMENTS

| | | | | |
|---|---|---|---|---|
| 2004/0267383 | A1* | 12/2004 | Bicknell | G07F 9/026 700/65 |
| 2008/0069121 | A1 | 3/2008 | Adamson et al. | |
| 2010/0085144 | A1* | 4/2010 | Aisa | G05B 19/0423 340/3.1 |
| 2011/0035180 | A1* | 2/2011 | Jin | H04L 12/66 702/122 |
| 2013/0066470 | A1* | 3/2013 | Wang | G05B 15/02 700/275 |
| 2014/0125817 | A1* | 5/2014 | Lee | H04L 43/0811 348/181 |
| 2015/0120006 | A1 | 4/2015 | Terashima et al. | |

FOREIGN PATENT DOCUMENTS

| | | |
|---|---|---|
| JP | H09-159268 A | 6/1997 |
| JP | 2004-145637 A | 5/2004 |
| JP | 2004-193688 | 7/2004 |
| JP | 2004-304275 A | 10/2004 |
| JP | 2005-184481 A | 7/2005 |
| JP | 2005-278068 A | 10/2005 |
| JP | 2006-222649 A | 8/2006 |
| JP | 2009-210041 A | 9/2009 |
| JP | 2010-114855 A | 5/2010 |
| JP | 2011-066493 A | 3/2011 |
| JP | 2015-088894 A | 5/2015 |
| KR | 10-2010-0075230 A | 7/2010 |
| KR | 10-1266047 B1 | 5/2013 |
| KR | 10-2013-0113249 A | 10/2013 |
| WO | 2008/064381 A2 | 6/2008 |

OTHER PUBLICATIONS

Guidelines for operating S-MARK Safety Certification for mechanism of remote control of air conditioner, Japan, Steering Council of Safety Certification for Electrical and Electronic Appliances and Parts of Japan, [online], May 29, 2013, the first edition, pp. 1-19.
Office Action dated Jul. 6, 2017 issued in corresponding KR patent application No. 10-2016-7009311 (and partial English translation).
Office Action dated Sep. 5, 2017 issued in corresponding JP patent application No. 2015-547332 (and partial English translation thereof).
Office Action dated Apr. 5, 2016 in the corresponding JP application No. 2015-547332 (with partial English translation).
International Search Report of the International Searching Authority dated Dec. 24, 2013 for the corresponding International application No. PCT/JP2013/080787 (and English translation).
Extended European Search Report dated Apr. 26, 2017 issued in corresponding EP patent application No. 13897411.8.
Office Action dated Jun. 27, 2018 issued in corresponding CN patent application No. 201380080907.7 (and English transiation).

\* cited by examiner

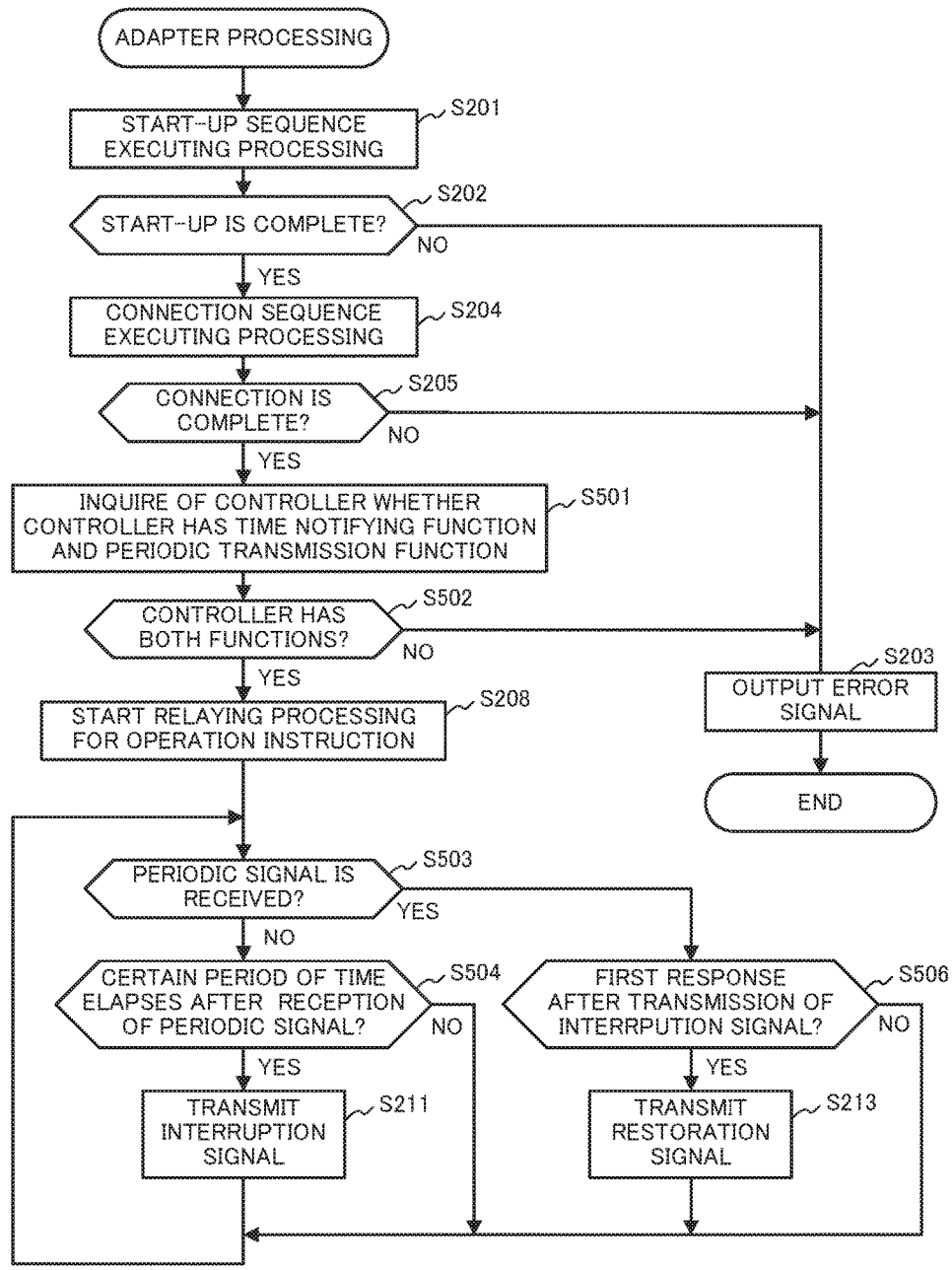

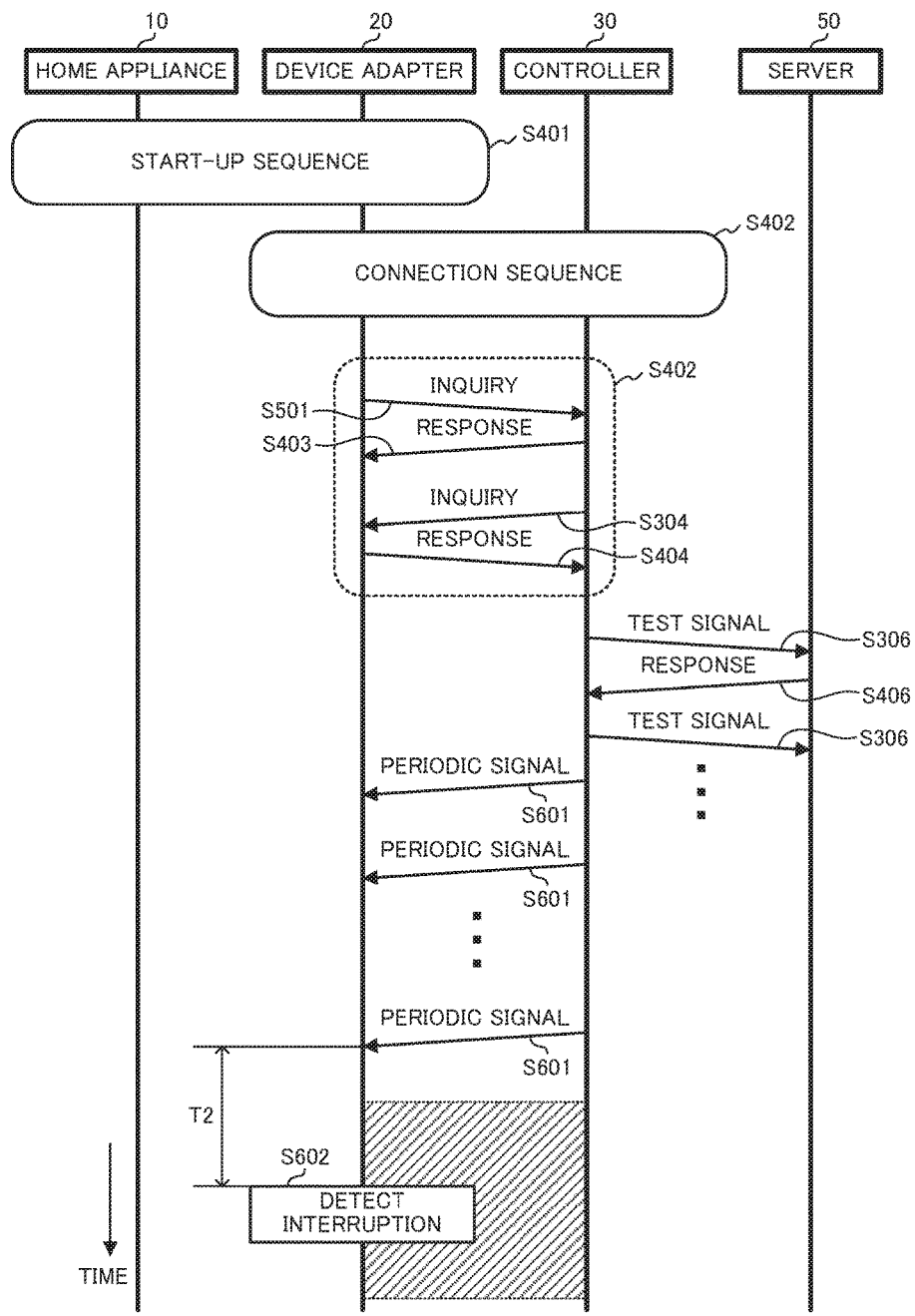

REMOTE CONTROL SYSTEM, IN-HOME DEVICE, RELAY APPARATUS, DEVICE MANAGEMENT METHOD, AND PROGRAM

CROSS REFERENCE TO RELATED APPLICATIONS

This application is the U.S. national phase of International Patent Application No. PCT/JP2013/080787 filed on Nov. 14, 2013, the disclosure of which is incorporated herein by reference.

TECHNICAL FIELD

The present disclosure relates to a remote control system, a home appliance, a relay device, an appliance management method, and a program.

BACKGROUND ART

Numerous appliances having a function of connecting to a home network have been commercially available in recent years. A user can, for example, operate such appliances via the network using this function. However, when the communication via the network is interrupted for some reason, the user loses the ability to operate the appliances via the network. To address this concern, techniques for detecting the communication interruption to recognize the inoperability of the appliances have been proposed (see, for example, Patent Literature 1).

CITATION LIST

Patent Literature

Patent Literature 1: Unexamined Japanese Patent Application Kokai Publication No. 2005-184481

SUMMARY OF INVENTION

Technical Problem

In a system disclosed in Patent Literature 1, the communication interruption during the operation of the appliance via the network may cause the appliance to keep operating according to the operation provided before the interruption. Here, when the communication interruption continues, the appliance keeps the operation for an extended time, which may be occasionally undesirable. Thus, there is a desire to properly manage appliances when the communication interruption continues.

The present disclosure has been made in view of the foregoing, and an objective of the present disclosure is to properly manage the appliances when the communication interruption continues.

Solution to Problem

To achieve the foregoing objective, a remote control system according to the present disclosure includes a home appliance, and a relay device configured to relay transmission of an operation instruction to remotely control the home appliance. The home appliance includes a first detector configured to detect a communication interruption on a first communication line for transmission of the operation instruction from the relay device to the home appliance, a receiver configured to receive, from the relay device, an interruption signal indicating a communication interruption on a second communication line for transmission of the operation instruction from a communication device to the relay device, and a state changer configured to change a state of the home appliance in accordance with a duration of at least one of the communication interruption detected by the first detector or the communication interruption indicated by the interruption signal received by the receiver. The relay device includes a second detector configured to detect the communication interruption on the second communication line and a transmitter configured to transmit the interruption signal to the home appliance when the communication interruption is detected by the second detector.

Advantageous Effects of Invention

According to the present disclosure, when the communication interruption continues, the state of the home appliance changes, thereby allowing proper management of the appliance.

BRIEF DESCRIPTION OF DRAWINGS

FIG. 12 is a flowchart illustrating adapter processing according to Embodiment 2; and FIG. 13 is a diagram illustrating another example in which the communication interruption has occurred.

DESCRIPTION OF EMBODIMENTS

Embodiments of the present disclosure are hereinafter described in detail with reference to the drawings.

Embodiment 1

Figure 1:
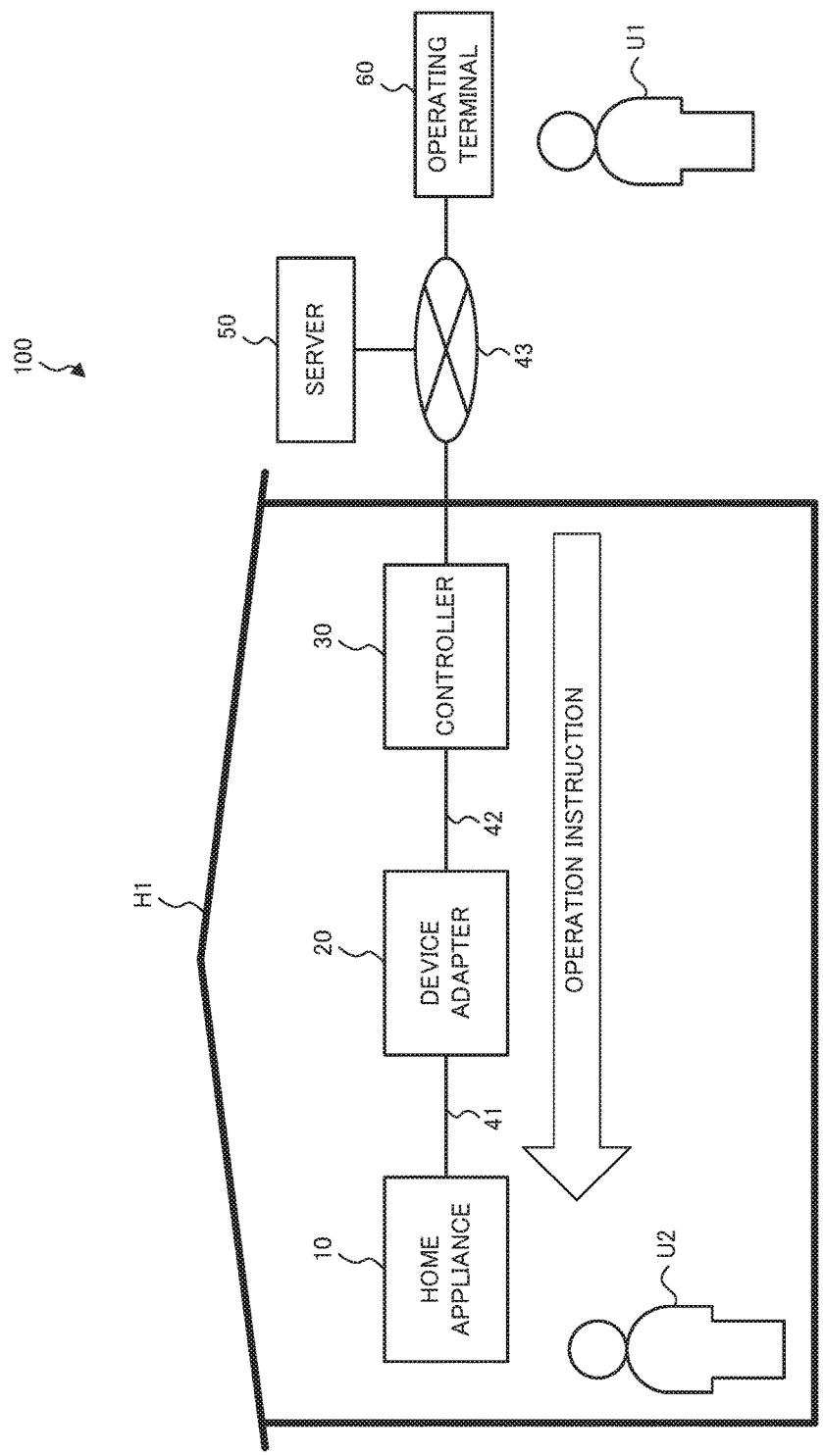
FIG. 1 is a diagram illustrating a configuration of a remote control system according to Embodiment 1.

FIG. 1 illustrates a configuration of remote control system 100 according to Embodiment 1. The remote control system 100 is a system for remotely controlling a home appliance 10 via a network. The remote control system 100 includes, as illustrated in FIG. 1, the home appliance 10 installed in a home H1, a device adapter 20 for connecting the home appliance 10 to a controller 30, the controller 30 for controlling the home appliance 10, a server 50 connected to the Internet, and an operating terminal 60 for a user U1 to enter operation details.

The home appliance 10 and the device adapter 20 are communicatively connected to each other through a communication line 41. The communication line 41 is a cable, for example for serial communication. The communication line 41 is for transmitting operation instructions for control of the home appliance 10 from the device adapter 20 to the home appliance 10.

The device adapter 20 and the controller 30 are communicatively connected to each other through a communication line 42. The communication line 42 is a home network, for example a wireless local area network (LAN) or the like, and is for transmitting data according to a communication protocol, such as ECHONET Lite. The data includes the operation instructions for controlling the home appliance 10.

The controller 30, the server 50, and the operating terminal 60 are connected to a communication line 43 to communicate with each other. The communication line 43 is a wide area network, for example the Internet or the like. The operation instructions are transmitted through the communication line 43 from the operating terminal 60 via the server 50 to the controller 30.

The home appliance 10 is facility equipment or a household electrical appliance that can be used by users U1 and U2 who live in the home H1. The home appliance 10 is, for example, an air conditioner for adjusting air conditions in a room within the home H1. The home appliance 10 may be an appliance (electrical appliance) other than the air conditioner. Examples of the home appliance 10 may include a refrigerator, a television, a rice cooker, an induction heating cooker, a floor heater, an electric water heater, a vacuum cleaner, a microwave oven, a storage battery, or a solar power generator. The home appliance 10 may also be any other air-conditioning apparatuses or cooking utensils.

The home appliance 10 operates according to the operation instruction received via the device adapter 20 and the controller 30. For example, when the home appliance receives an operation instruction for starting a cooling operation while in a state of rest, the home appliance 10 starts the cooling operation to blow cool air from an air outlet.

The operating state of the home appliance 10 is indicated by a value of a property defined in ECHONET Lite. For example, the property on the home appliance includes an "operation mode", and the value of the "operation mode" is "heating", "cooling", "dehumidifying", or "rest". The operating state of the home appliance 10 is changed by setting according to the operation instruction.

Figure 2:
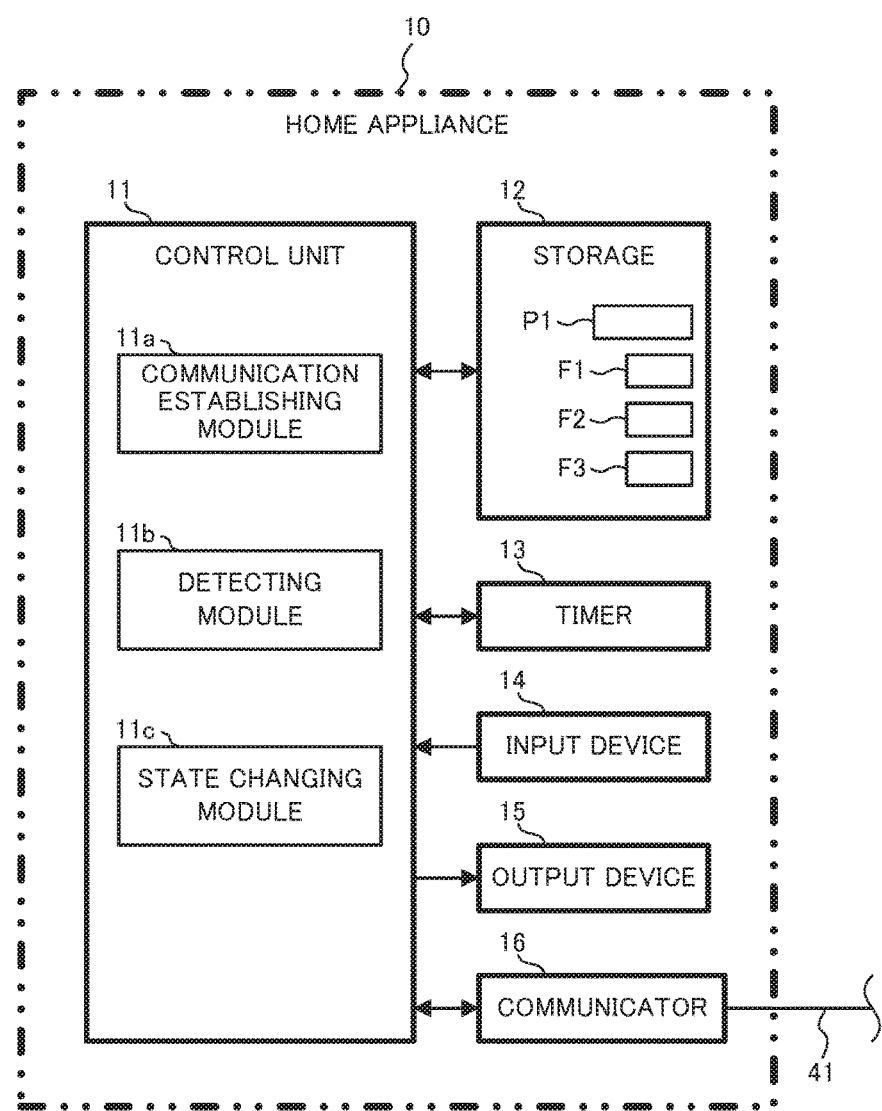
FIG. 2 is a diagram illustrating a configuration of a home appliance.

FIG. 2 illustrates a configuration of the home appliance 10. As illustrated in FIG. 2, the home appliance 10 includes a control unit 11 for controlling each component of the home appliance 10, a storage 12 for storing data, a timer 13 for measuring time, an input device 14 for manual operation of the home appliance 10 without the interposed communication line 41, an output device 15 for operation of the home appliance 10, and a communicator 16 for communication via the communication line 41.

The control unit 11 is configured by, for example, a central processing unit (CPU), random access memory (RAM), and the like. The control unit 11 executes a program P1 stored in the storage 12 to perform a variety of functions. The control unit 11 includes, as its functions, a communication establishing module 11a for establishing communication with the device adapter 20, a detecting module 11b for detecting an interruption and restoration of the communication on the communication line 41, and a state changing module 11c for changing the operating state of the home appliance 10.

The storage 12 includes nonvolatile memory, such as a hard disk, flash memory, or the like. The storage 12 stores, in addition to the program P1, various data used for processing by the control unit 11. The data includes a first flag F1, a second flag F2, and a third flag F3, which indicate a communication interruption on the respective communication lines 41, 42, and 43.

The timer 13 is configured by, for example, a quartz oscillator or the like. The timer 13 measures time according to the instructions of the control unit 11. The timer 13 then notifies the measured result to the control unit 11 in response to the request from the control unit 11.

The input device 14 is configured by, for example, input keys, a capacitive pointing device, and the like. The input device 14 acquires the operation details entered by the user U2 who is at home, and transmits to the control unit 11 a signal indicating the operation details.

The output device 15 is configured by, for example, a fan for blowing air, a motor for adjusting an angle of a louver, or the like. When the home appliance 10 is a television, the output device 15 is configured by, for example, a liquid crystal display or the like, whereas when the home appliance 10 is a vacuum cleaner, the output device 15 is configured by a motor for drawing air, or the like.

The communicator 16 is configured by a communication interface for transmitting and receiving a data signal in a form suitable for the communication line 41, or the like. The communicator 16 extracts, from the signal received via the communication line 41, data carried by the signal, and outputs the data to the control unit 11. The communicator 16 generates a signal carrying the data output by the control unit 11 and transmits the signal via the communication line 41.

Figure 3:
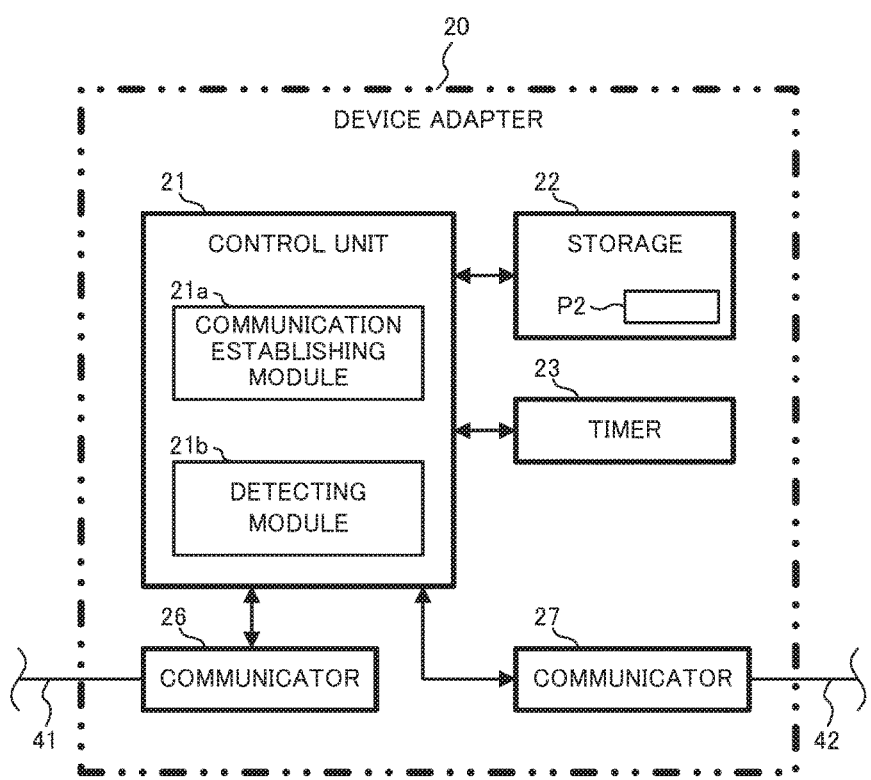
FIG. 3 is a diagram illustrating a configuration of a device adapter.

Returning to FIG. 1, the device adapter 20 is a device for relaying transmission of the operation instructions or the like by converting the data signal in a form suitable for the communication line 42 into the data signal in the form suitable for the communication line 41. The device adapter 20 includes, as illustrated in FIG. 3, a control unit 21 for controlling each component of the device adapter 20, a storage 22 for storing data, a timer 23 for measuring time, a communicator 26 for communication via the communication line 41, and a communicator 27 for communication via the communication line 42.

The control unit 21 is configured by, for example, CPU, RAM, and the like. The control unit 21 executes a program P2 stored in the storage 22 to perform a variety of functions. The control unit 21 includes, as its functions, a communication establishing module 21a for establishing communication with the home appliance 10 and with the controller 30, and a detecting module 21b for detecting an interruption and restoration of the communication on the communication line 42.

The storage 22 includes nonvolatile memory, such as flash memory or the like. The storage 22 stores, in addition to the program P2, various data used for processing by the control unit 21.

The timer 23 is configured by, for example, a quartz oscillator or the like. The timer 23 measures time according to the instructions of the control unit 21, and notifies the measured result to the control unit 21 in response to the request from the control unit 21.

The communicators 26 and 27 are each configured by a communication interface for transmitting and receiving a data signal in a form suitable for the respective communication lines 41 and 42, or the like. The communicators 26 and 27 each extract, from the signal received via the respective communication lines 41 and 42, data carried by the signal, and output the data to the control unit 21. The communicators 26 and 27 each generate a signal carrying the data output by the control unit 21 and transmit the signal via the respective communication lines 41 and 42.

Returning to FIG. 1, the controller 30 is a home energy management system (HEMS) controller for controlling the home appliance 10. The controller 30 functions as a gateway server for relaying transmission of the operation instruction transmitted from the server 50 to the home appliance 10. For example, the controller 30 receives via the communication line 43 an operating signal indicating the details of the remote control operation. The controller 30 then generates a control command for controlling the home appliance 10 based on the details of the operation indicated by the received operating signal, and transmits, as the operation instruction, the control command to the home appliance 10 via the device adapter 20.

Figure 4:
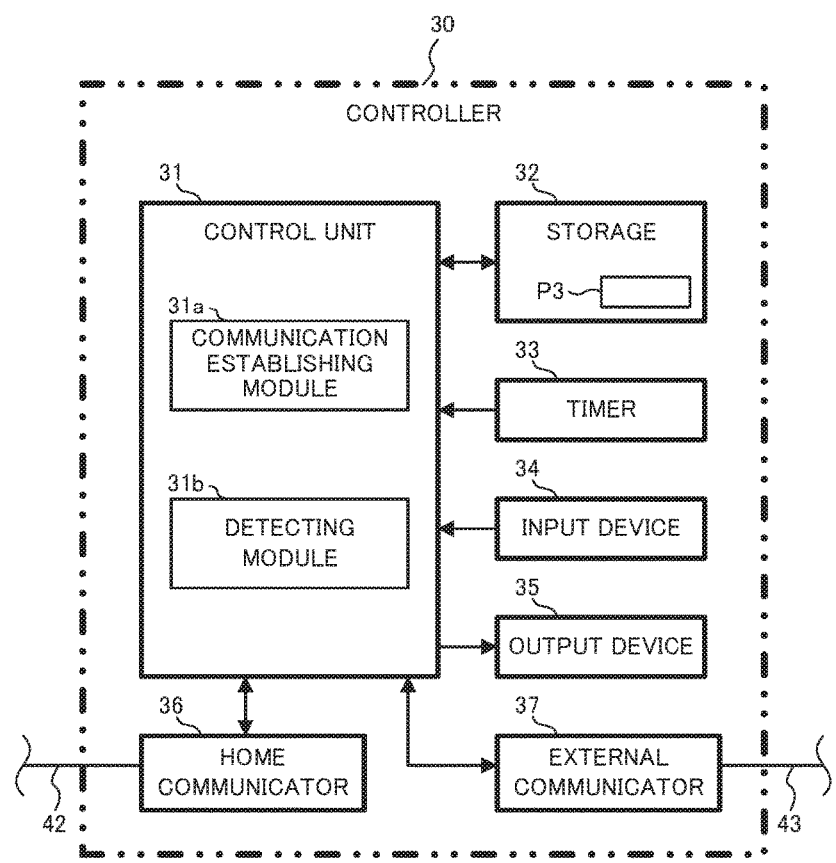
FIG. 4 is a diagram illustrating a configuration of a controller.

The controller 30 includes, as illustrated in FIG. 4, a control unit 31 for controlling each component of the controller 30, a storage 32 for storing data, a timer 33 for measuring time, an input device 34 for acquiring information that is input by an administrator of the controller 30, an output device 35 for presenting information to the administrator, a home communicator 36 for communication via the communication line 42, and an external communicator 37 for communication via the communication line 43.

The control unit 31 is configured by, for example, CPU, RAM, and the like. The control unit 31 executes a program P3 stored in the storage 32 to perform a variety of functions. The control unit 31 includes, as its functions, a communication establishing module 31*a* for establishing communication with the device adapter 20 and for establishing communication via the communication line 43, and a detecting module 31*b* for detecting an interruption and restoration of the communication on the communication line 43.

The storage 32 includes nonvolatile memory, such as flash memory or the like. The storage 32 stores, in addition to the program P3, various data used for processing by the control unit 31.

The timer 33 is configured by, for example, a quartz oscillator or the like. The timer 33 measures time according to the instructions of the control unit 31, and notifies the measured result to the control unit 31 in response to the request from the control unit 31.

The input device 34 includes a keyboard, a pointing device including a mouse, or the like. The input device 34 acquires information that is, for example, input by the administrator, and notifies the information to the control unit 31.

The output device 35 is configured by a liquid crystal display, a speaker, or the like. The output device 35 may provide the administrator with display of characters and graphics or reproduce an acoustic signal, in accordance with the instructions of the control unit 31.

The home communicator 36 and the external communicator 37 are each configured by a communication interface for communicating according to communication protocols of the respective communication lines 42 and 43, or the like. The home communicator 36 and the external communicator 37 each output to the control unit 31 the data included in packets received via the respective communication lines 42 and 43. The home communicator 36 and the external communicator 37 each generate packets including data that is output by the control unit 31, and transmit the packets via the respective communication lines 42 and 43.

Subsequently, the processing executed by each of the home appliance 10, the device adapter 20, and the controller 30 is described hereinafter in connection with FIGS. 5 to 9.

Figure 5:
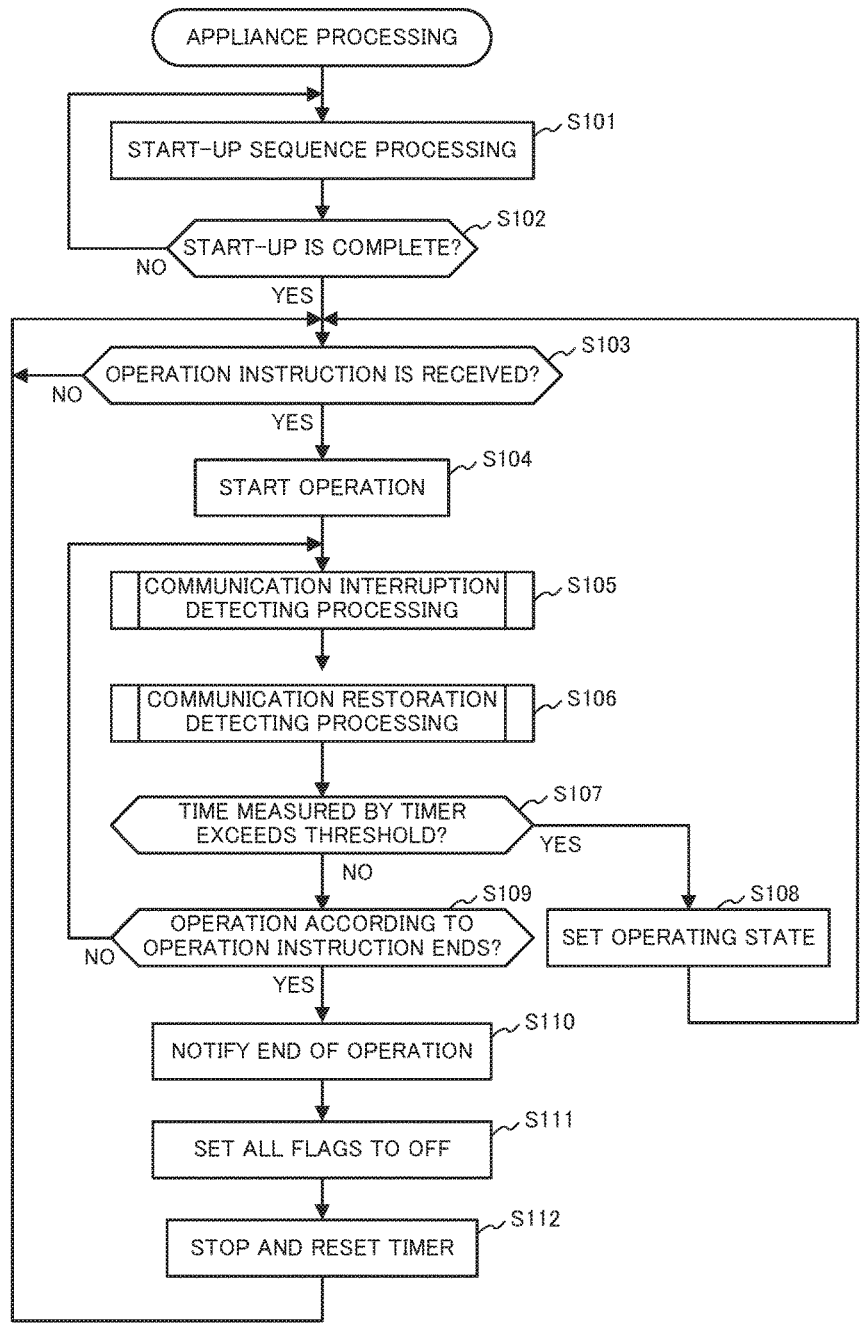
FIG. 5 is a flowchart illustrating appliance processing performed by the home appliance.

FIG. 5 illustrates appliance processing performed by the home appliance 10. The appliance processing starts by activating the power of the home appliance 10.

As illustrated in FIG. 5, the control unit 11 of the home appliance 10 performs start-up sequence processing (Step S101). Specifically, the communication establishing module 11*a* confirms, by transmitting and receiving data to and from the device adapter 20, that the communication line 41 is available.

The start-up sequence processing may include authentication of the device adapter 20. When the start-up sequence processing includes the authentication of the device adapter 20, the communication establishing module 11*a* can specify a type of the device adapter 20 or establish communication only with the device adapter 20 having a particular function.

Then, the communication establishing module 11*a* determines whether the start-up is complete (Step S102). Specifically, the communication establishing module 11*a* determines whether the start-up sequence processing ends normally and the communication with the device adapter 20 via the communication line 41 is established.

Then, the control unit 1 determines whether the communicator 16 receives an operation instruction (Step S103). Specifically, the control unit 11 determines whether the communicator 16 receives a control command via the communication line 41. The control command is, for example, a command for starting a cooling operation. When the control unit 11 determines that the communicator 16 does not receive the operation instruction (Step S103; No), the control unit 11 repeats the determination of Step S103.

When the control unit 11 determines that the communicator 16 receives the operation instruction (Step S103; Yes), the control unit 11 causes the output device 15 to start operating according to the operation instruction (Step S104). The home appliance thereby starts an operation, for example a cooling operation.

Figure 6:
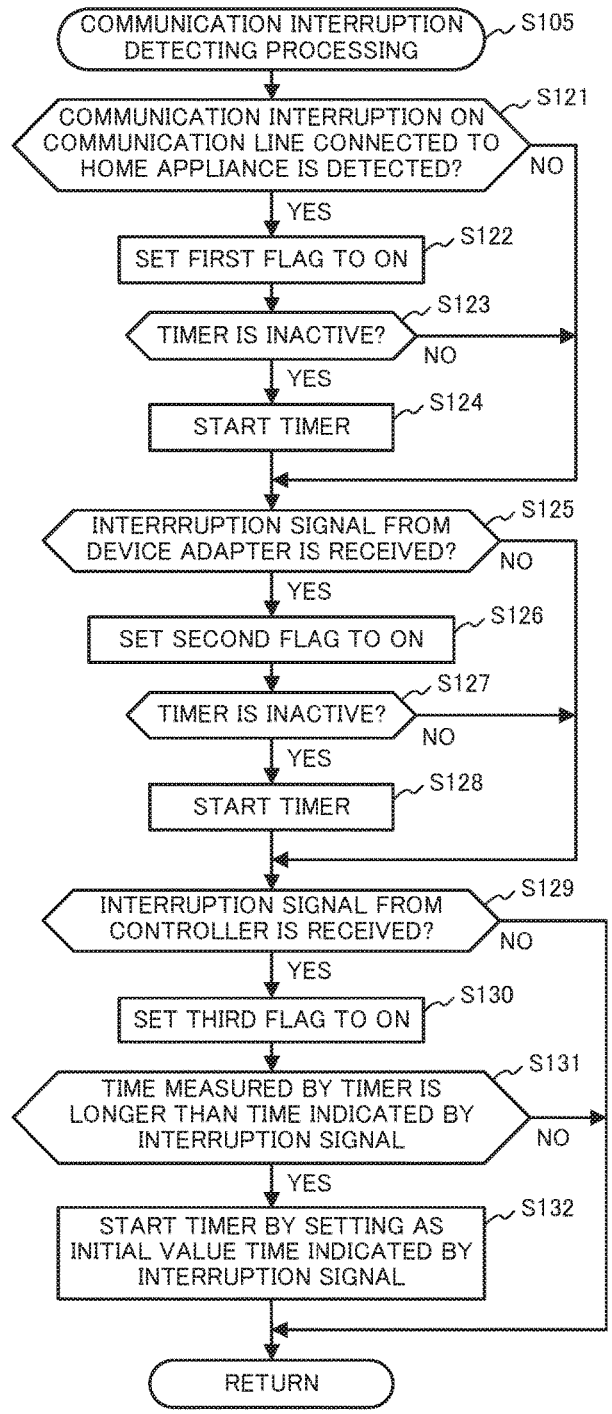
FIG. 6 is a flowchart illustrating communication interruption detecting processing.

The control unit 11 then performs communication interruption detecting processing (Step S105). The detecting module 11*b* detects a communication interruption on each of the communication lines 41 to 43 in the communication interruption detecting processing. FIG. 6 illustrates in detail processing performed in the communication interruption detecting processing.

As illustrated in FIG. 6, in the communication interruption detecting processing, the detecting module 11*b* determines whether the detecting module 11*b* detects a communication interruption on the communication line 41 connected to the home appliance 10 (Step S121). For example, when a periodic signal that is transmitted from the device adapter 20 at 10 second intervals is not received in the past 30 seconds, the detecting module 11*b* determines that the communication on the communication line 41 is interrupted. The periodic signal may be a response of the device adapter 20 to data transmitted from the home appliance 10, or a signal transmitted spontaneously by the device adapter 20.

The communication interruption herein means a situation in which the communication line fails to fulfill its intended function. For example, the interrupted communication on the communication line prevents one side of the communication line from receiving data in a certain period of time after transmission of the data from the other side thereof.

From this point of view, the communication interruption includes situations of a very narrower band and a significant delay of communication.

When a determination is made that the detecting module 11b does not detect the communication interruption on the communication line 41 (Step S121; No), the detecting module 11b causes processing to proceed to Step S125. When a determination is made that the detecting module 11b detects the communication interruption on the communication line 41 (Step S121; Yes), the detecting module 11b sets a first flag F1 to ON (Step S122).

Then, the detecting module 11b determines whether the timer 13 is in an inactive state (Step S123). Specifically, the detecting module 11b determines whether the timer 13 has yet to measure the time elapsed from a specific time. When the detecting module 11b determines that the timer 13 is not in the inactive state (Step S123; No), the detecting module 11b causes processing to proceed to Step S125.

When the detecting module 11b determines that the timer 13 is in the inactive state (Step S123; Yes), the detecting module 11b starts the timer (Step S124). Specifically, the detecting module 11b causes the timer 13 to start measuring time. The timer 13 thereby starts measuring a length of elapsed time from the current time.

Then, the detecting module 11b determines whether the communicator 16 receives an interruption signal from the device adapter 20 (Step S125). The interruption signal from the device adapter 20 is a signal indicating that the communication on the communication line 42 is interrupted.

When the detecting module 11b determines that the communicator 16 does not receive the interruption signal (Step S125; No), the detecting module 11b causes processing to proceed to Step S129. When the detecting module 11b determines that the communicator 16 receives the interruption signal (Step S125; Yes), the detecting module 11b sets a second flag F2 to ON (Step S126).

Then, the detecting module 11b determines whether the timer 13 is in an inactive state (Step S127). When the detecting module 11b determines that the timer 13 is not in the inactive state (Step S127; No), the detecting module 11b causes processing to proceed to Step S129. When the detecting module 11b determines that the timer 13 is in the inactive state (Step S127; Yes), the detecting module 11b starts the timer 13 (Step S128).

Then, the detecting module 11b determines whether the communicator 16 receives the interruption signal from the controller 30 (Step S129). The interruption signal from the controller 30 indicates that the communication on the communication line 43 is interrupted and also indicates a duration of the interruption.

When the detecting module 11b determines that the communicator 16 does not receive the interruption signal (Step S129; No), the detecting module 11b ends the communication interruption detecting processing. When the detecting module 11b determines that the communicator 16 receives the interruption signal (Step S129; Yes), the detecting module 11b sets a third flag F3 to ON (Step S130).

Then, the detecting module 11b determines whether the time (measured result) measured by the timer 13 is longer than the time indicated by the interruption signal that is determined as being received in Step S129 (Step S131). When the detecting module 11b determines that the measured result of the timer 13 is not longer than the time indicated by the interruption signal (Step S131; No), the detecting module 11b ends the communication interruption detecting processing.

When the detecting module 11b determines that the measured result of the timer 13 is longer than the time indicated by the interruption signal (Step S131; Yes), the detecting module 11b starts the timer 13 by setting as the initial value the time indicated by the interruption signal (Step S132). The timer 13 thereby starts measuring a length of time that is obtained by adding the time elapsed from the current time to the time indicated by the interruption signal. Then, the detecting module 11b ends the communication interruption detecting processing.

Figure 7:
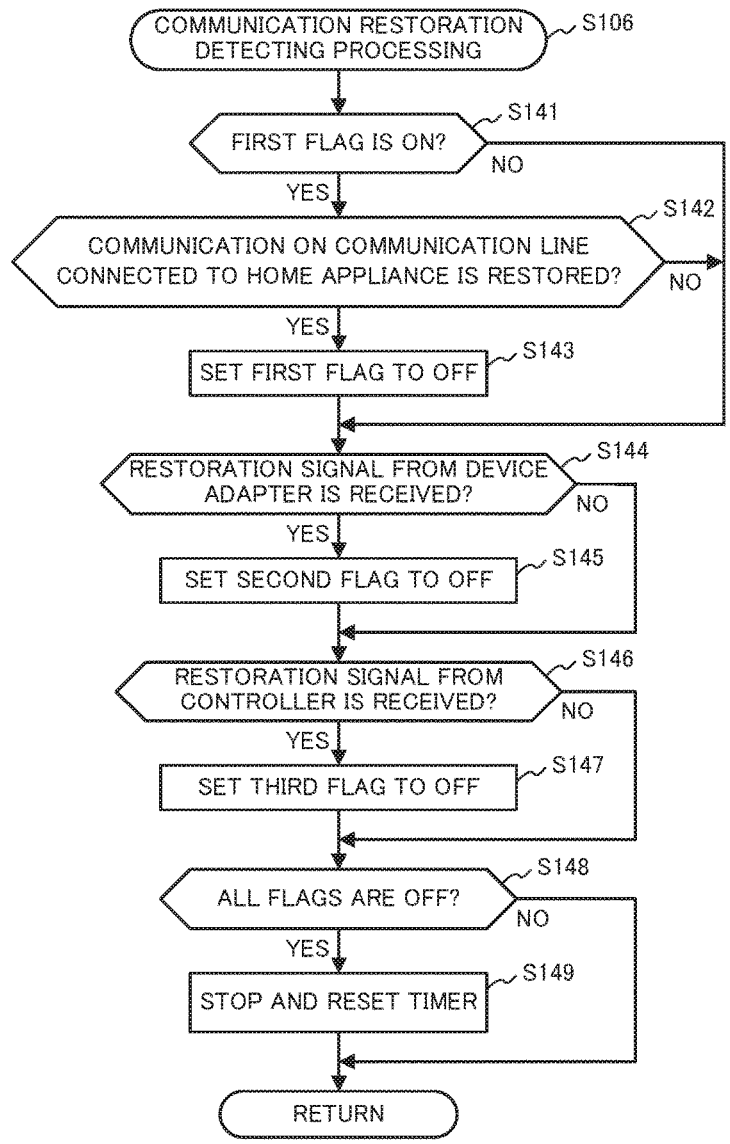
FIG. 7 is a flowchart illustrating communication restoration detecting processing.

Returning to FIG. 5, subsequent to the communication interruption detecting processing (Step S105), the detecting module 11b performs communication restoration detecting processing (Step S106). In the communication restoration detecting processing, the detecting module 11b detects restoration of the communication on each of the communication lines 41 to 43. FIG. 7 illustrates in detail the processing performed in the communication restoration detecting processing.

As illustrated in FIG. 7, in the communication restoration detecting processing, the detecting module 11b initially determines whether the first flag F1 is set to ON (Step S141). When the detecting module 11b determines that the first flag F1 is not set to ON (Step S141; No), the detecting module 11b causes processing to proceed to Step S144.

When the detecting module 11b determines that the first flag F1 is set to ON (Step S141; Yes), the detecting module 11b determines whether the communication on the communication line 41 connected to the home appliance 10 is restored (Step S142). For example, when the periodic signal from the device adapter 20 is received in the past seconds, the detecting module 11b determines that the communication on the communication line 41 is restored.

When the detecting module 11b determines that the communication is not restored (Step S142; No), the detecting module 11b causes processing to proceed to Step S144. When the detecting module 11b determines that the communication is restored (Step S142; Yes), the detecting module 11b sets the first flag F1 to OFF (Step S143).

Then, the detecting module 11b determines whether the communicator 16 receives a restoration signal from the device adapter 20 (Step S144). The restoration signal from the device adapter 20 is a signal indicating that the communication on the communication line 42 is restored from the interrupted state.

When the detecting module 11b determines that the communicator 16 does not receive the restoration signal (Step S144; No), the detecting module 11b causes processing to proceed to Step S146. When the detecting module 11b determines that the communicator 16 receives the restoration signal (Step S144; Yes), the detecting module 11b sets the second flag F2 to OFF (Step S145).

Then, the detecting module 11b determines whether the communicator 16 receives the restoration signal from the controller 30 (Step S146). The restoration signal from the controller 30 is a signal indicating that the communication on the communication line 43 is restored from the interrupted state.

When the detecting module 11b determines that the communicator 16 does not receive the restoration signal (Step S146; No), the detecting module 11b causes processing to proceed to Step S148. When the detecting module 11b determines that the communicator 16 receives the restoration signal (Step S146; Yes), the detecting module 11b sets the third flag F3 to OFF (Step S147).

Then, the detecting module 11b determines whether the first flag F1, the second flag F2, and the third flag F3 are all set to OFF (Step S148). When the detecting module 11b determines that the first flag F1, the second flag F2, and the third flag F3 are not all set to OFF (Step S148; No), the detecting module 11b ends the communication restoration detecting processing. In other words, when the detecting module 11b determines that at least one of the first flag F1, the second flag F2, or the third flag F3 is set to ON, the communication restoration detecting processing ends.

When the detecting module 11b determines that the first flag F1, the second flag F2, and the third flag F3 are all set to OFF (Step S148; Yes), the detecting module 11b stops the timer 13 measuring the time and resets the timer 13 (Step S149). Then, the detecting module 11b ends the communication restoration detecting processing.

Returning to FIG. 5, subsequent to the communication restoration detecting processing (Step S106), the control unit 11 determines whether the time measured by the timer 13 exceeds a threshold (Step S107). This threshold is, for example, 24 hours. Another value of time may be previously set as the threshold. The users U1 and U2 may change the threshold to another value using the input device 14.

When the control unit 11 determines that the time measured by the timer 13 exceeds the threshold (Step S107; Yes), the control unit 11 sets the operating state of the home appliance 10 (Step S108). Specifically, the state changing module 11c changes the operating state of the home appliance 10 to a preset target state. The target state is, for example, a "rest" state. After the setting of the operating state, the control unit 11 repeats the processing from Step S103.

When control unit 11 determines that the time measured by the timer 13 does not exceed the threshold (Step S107; No), the control unit 11 determines whether the operation according to the operation instruction, which is determined as being received by the communicator 16 in Step S103, ends (Step S109). When the control unit 11 determines that the operation does not end (Step S109; No), the control unit 11 repeats the processing from Step S105.

When the control unit 11 determines that the operation ends (Step S109; Yes), the control unit 11 notifies, to the user U1 who has performed the remote control, the end of the operation according to the operation instruction (Step S110). Then, the control unit 11 sets first flag F1, the second flag F2, and the third flag F3 all to OFF (Step S111). Then, the control unit 11 stops the timer 13 measuring the time and resets the timer 13 (Step S112). Then, the control unit 11 repeats the processing from Step S103.

Subsequently, the adapter processing performed by the device adapter 20 is described hereinafter with reference to FIG. 8. The adapter processing starts by activating the power of the device adapter 20.

Figure 8:
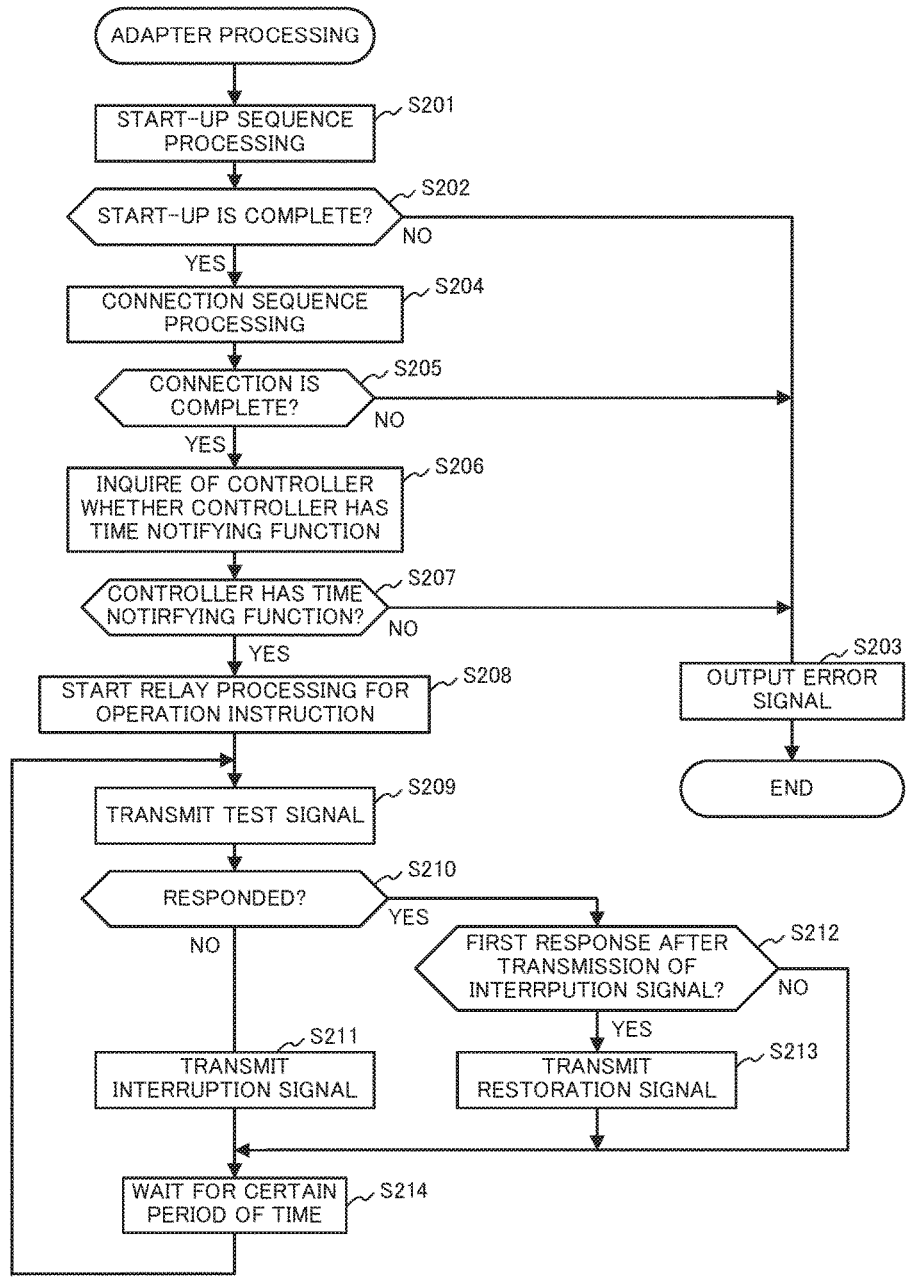
FIG. 8 is a flowchart illustrating an adapter processing performed by the device adapter.

As illustrated in FIG. 8, the control unit 21 of the device adapter 20 initially performs start-up sequence processing (Step S201). The start-up sequence processing is executed in conjunction with the start-up sequence processing by the home appliance 10 (Step S101). In the start-up sequence processing of the device adapter 20, the communication establishing module 21a confirms that the communication line 41 is available. The start-up sequence processing may include authentication of the home appliance 10. Such an authentication allows the communication establishing module 21a to, for example, specify a type of the home appliance 10 connected to the device adapter 20 or establish communication only with the home appliance 10 having a particular function.

Then, the communication establishing module 21a determines whether the start-up is complete (Step S202). Specifically, the communication establishing module 21a determines whether the start-up sequence processing ends normally and the communication with the home appliance 10 is established.

When the communication establishing module 21a determines that the start-up is not complete (Step S202; No), the control unit 21 outputs an error signal (Step S203). Then, the control unit 21 ends the adapter processing.

When the communication establishing module 21a determines that the start-up is complete (Step S202; Yes), the communication establishing module 21a performs the connection sequence processing (Step S204). Specifically, the communication establishing module 21a confirms that the communication line 42 is available, by transmitting and receiving data to and from the controller 30.

Then, the communication establishing module 21a determines whether the connection is complete (Step S205). Specifically, the communication establishing module 21a determines whether the communication with the controller 30 is established after the connection sequence processing ends normally.

When the communication establishing module 21a determines that the connection is not complete (Step S205; No), the control unit 21 causes the processing to proceed to Step S203. When the communication establishing module 21a determines that the connection is complete (Step S205; Yes), the control unit 21 inquires of the controller 30 whether the controller 30 has a time notifying function (Step S206). The time notifying function, which the controller 30 has, refers to the function to notify the home appliance 10 or the device adapter 20 of the duration of the communication interruption on the communication line 43.

Then, the control unit 21 determines, based on a response of the controller 30 to the inquiry in Step S206, whether the controller 30 has the time notifying function (Step S207). When the control unit 21 determines that the controller 30 does not have the time notifying function (Step S207; No), the control unit 21 causes the processing to proceed to Step S203.

When the control unit 21 determines that the controller 30 has the time notifying function (Step S207; Yes), the control unit 21 starts relay processing for the operation instruction (Step S208). This relay processing is processing of transmitting the operation instruction, which is received via the communication line 42, to the home appliance 10 via the communication line 41. This relay processing is executed in parallel with the adapter processing.

Then, the detecting module 21b transmits to the controller 30 a test signal for testing the state of the communication line 42 (Step S209). Then, the detecting module 21b determines whether there is a response of the controller 30 to the test signal (Step S210).

When the detecting module 21b determines that there is no response (Step S210; No), the detecting module 21b transmits the interruption signal to the home appliance 10 (Step S211). Then, the detecting module 21b causes the processing to proceed to Step S214.

When the detecting module 21b determines that there is the response (Step S210; Yes), the detecting module 21b determines whether this response is the first response after the transmission of the interruption signal (Step S212). When the determination in Step S212 is negative (Step S212; No), the detecting module 21b causes the processing to proceed to Step S214.

When the determination in Step S212 is affirmative (Step S212; Yes), the detecting module 21b transmits the restoration signal to the home appliance 10 (Step S213).

The detecting module 21b waits for a certain period of time using the timer 23 (Step S214). This waiting period of time is, for example, 1 minute. Then, the detecting module 21b repeats the processing from Step S209. The device adapter 20 thus determines, at a regular interval, whether the communication on the communication line 42 is interrupted or restored. The result of the determination is then notified to the home appliance 10.

Subsequently, the controller processing performed by the controller 30 is described hereinafter with reference to FIG. 9. The controller processing starts by activating the power of the controller 30.

Figure 9:
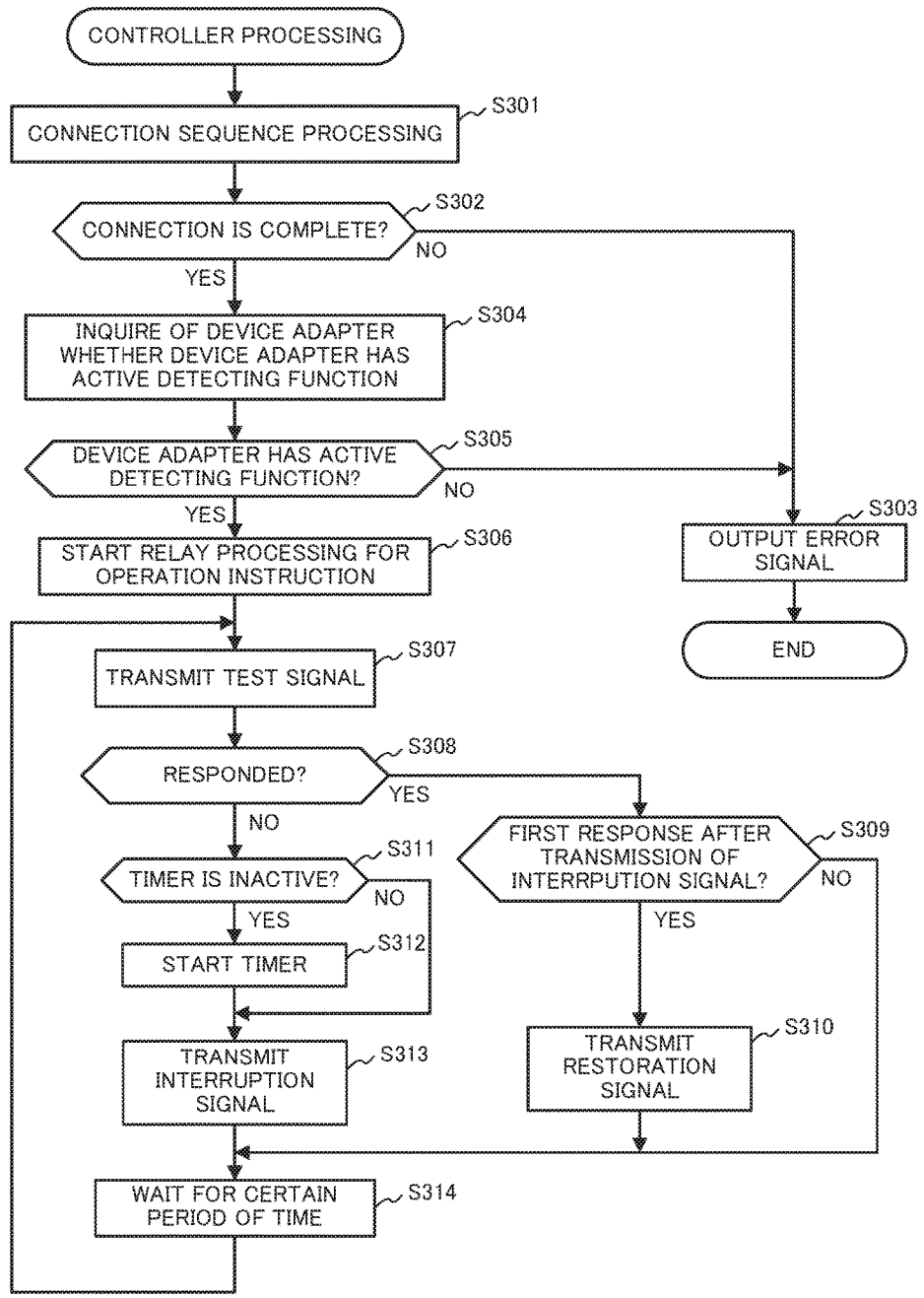
FIG. 9 is a flowchart illustrating controller processing performed by the controller.

As illustrated in FIG. 9, the control unit 31 of the controller 30 initially performs connection sequence processing (Step S301). The connection sequence processing is executed in conjunction with the connection sequence processing (Step S201) by the device adapter 20. In the connection sequence processing of the controller 30, the communication establishing module 31a confirms that the communication lines 42 and 43 are available.

Then, the communication establishing module 31a determines whether the connection is complete (Step S302). Specifically, the communication establishing module 31a determines whether the connection sequence processing ends normally and the communications via the communication lines 42 and 43 are established.

When the communication establishing module 31a determines that the connection is not complete (Step S302; No), the control unit 31 outputs an error signal (Step S303). Then, the control unit 31 ends the controller processing.

When the communication establishing module 31a determines that the connection is complete (Steps S302; Yes), the communication establishing module 31a inquires of the device adapter 20 whether the device adapter 20 has an active detecting function (Step S304). The active detecting function refers to a function equivalent to the detecting module 21b of the present embodiment.

Then, the communication establishing module 31a determines, based on a response of the device adapter 20 to the inquiry in Step S304, whether the device adapter has the active detecting function (Step S305). When the communication establishing module 31a determines that the device adapter 20 does not have the active detecting function (Step S305; No), the control unit 31 causes the processing to proceed to Step S303.

When the communication establishing module 31a determines that the device adapter 20 has the active detecting function (Step S305; Yes), the control unit 31 starts relay processing for the operation instruction (Step S306). This relay processing is processing of transmitting the operation instruction, which is received via the communication line 43, to the home appliance 10 via the device adapter 20. This relay processing is executed in parallel with the controller processing.

Then, the detecting module 31b transmits to the server 50 a test signal for testing the state of the communication line 43 (Step S307). Then, the detecting module 31b determines whether there is a response of the server 50 to the test signal (Step S308).

When the detecting module 31b determines that there is the response (Step S308; Yes), the detecting module 31b determines whether this response is the first response after the transmission of the interruption communication (Step S309). When the determination in Step S309 is negative (Step S309; No), the detecting module 31b causes the processing to proceed to Step S314.

When the processing in Step S309 is affirmative (Step S309; Yes), the detecting module 31b determines that the communication on the communication line 43 is restored, and transmits the restoration signal to the home appliance 10 (Step S310). Then, the detecting module 31b causes the processing to proceed to Step S314.

In Step S308, when the detecting module 31b determines that there is no response (Step S308; No), the detecting module 31b determines whether the timer 33 is in an inactive state (Step S311). When the detecting module 31b determines that the timer 33 is not in the inactive state (Step S311; No), the detecting module 31b causes the processing to proceed to Step S313. When the detecting module 31b determines that the timer 33 is in the inactive state (Step S311; Yes), the detecting module 31b starts the timer 33 (Step S312).

Then, the detecting module 31b determines that the communication on the communication line 43 is interrupted, and transmits, to the home appliance 10, an interruption signal indicating that the communication interruption on the communication line 43 continues for a period of time measured by the timer 33 (Step S313).

The detecting module 31b waits for a certain period of time (Step S314). This waiting period of time is, for example, 30 minutes. Then, the detecting module 31b repeats the processing from Step S307. The controller 30 thus determines, at a regular interval, whether the communication on the communication line 43 is interrupted or restored. The result of the determination is then notified to the home appliance 10.

Subsequently, the communication among the home appliance 10, the device adapter 20, the controller 30, and the server 50 is described hereinafter with reference to FIG. 10. The sequence diagram of FIG. 10 illustrates communication from a time when the communication on the communication lines 41 to 43 is established until a time when the remote control operation is complete.

Figure 10:
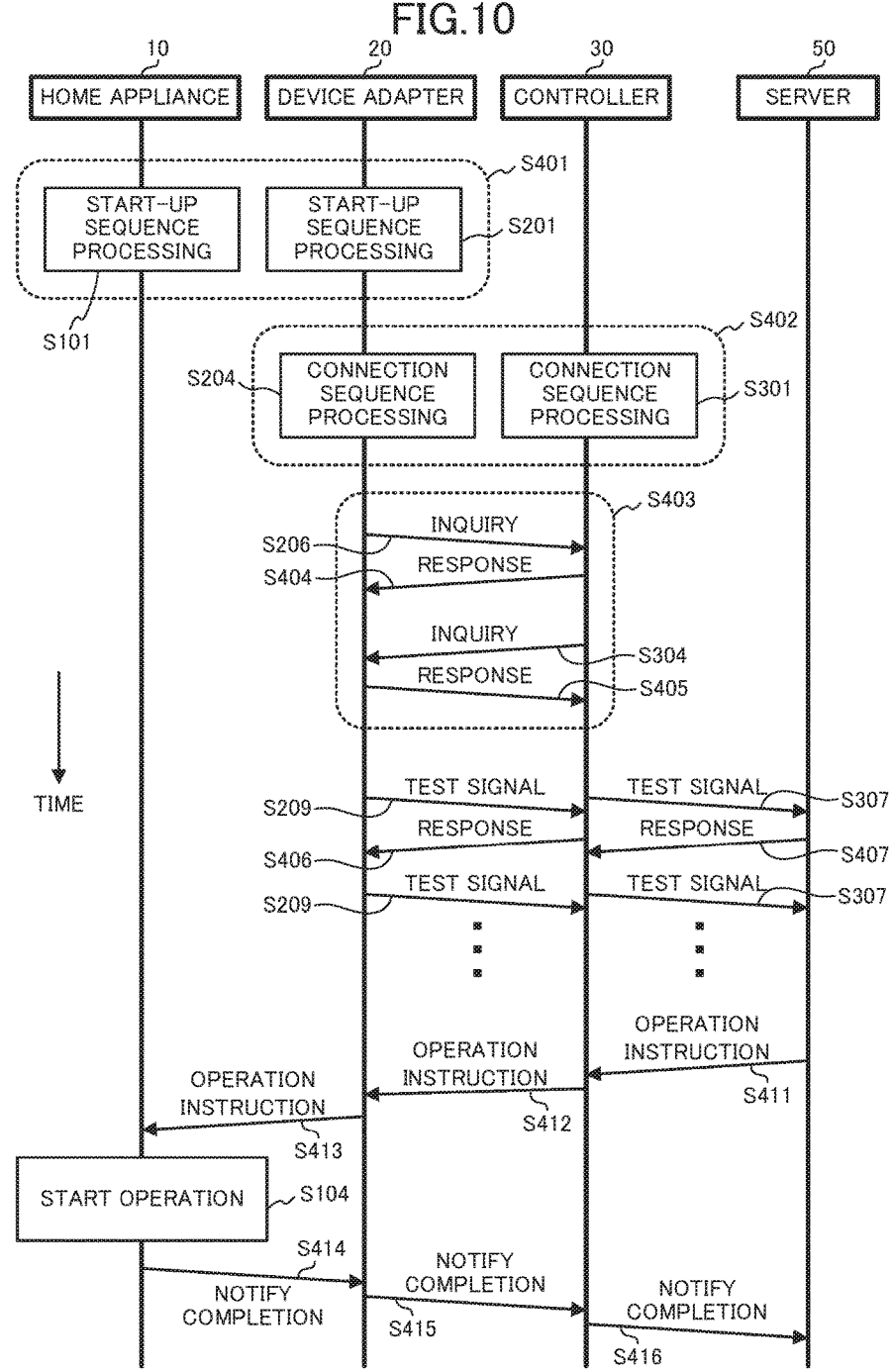
FIG. 10 is a diagram illustrating an example of communication from a time when the remote control system is constructed to a time when the remote control operation is complete.

As illustrated in FIG. 10, the home appliance 10 and the device adapter 20 initially performs a start-up sequence S401. Specifically, the start-up sequence processing (Step S101) by the home appliance 10 and the start-up sequence processing (Step S201) by the device adapter 20 are executed in conjunction with each other. The communication on the communication line 41 is thus established.

Then, the device adapter 20 and the controller 30 perform a connection sequence S402. Specifically, the connection sequence processing by the device adapter (Step S204) and the connection sequence processing by the controller 30 (Step S301) are executed in conjunction with each other. The communication on the communication line 42 is thus established.

Then, the device adapter 20 and the controller 30 perform an authentication sequence S403. Specifically, the device adapter 20 inquires of the controller 30 whether the controller 30 has a time notifying function (Step S206). The controller 30 responds to the inquiry to notify that the controller 30 has the time notifying function (Step S404). The controller 30 also inquires of the device adapter 20 whether the device adapter 20 has the active detecting function (Step S304). The device adapter 20 responds to the inquiry to notify that the device adapter 20 has the active detecting function (Step S405).

Then, the device adapter 20 periodically transmits test signals to the controller (Step S209). The controller 30 responds to the device adapter 20 when receiving the test signals (Step S406). The device adapter 20 thereby monitors whether the communication on the communication line 42 is interrupted.

The controller 30 also periodically transmits test signals to the server 50 (Step S307). The server 50 responds to the controller 30 when receiving the test signals (Step S407). The controller 30 thereby monitors whether the communication on the communication line 43 is interrupted.

When the user U1 enters the operation instruction for the home appliance 10 into the operating terminal 60, the server 50 relays the transmission of the operation instruction to the home appliance 10 (Step S411). Specifically, the server 50 transmits the operation instruction to the controller 30. Thereafter, the controller 30 relays the transmission of the operation instruction (Step S412), and the device adapter 20 in turn relays the transmission of the operation instruction.

Then, the home appliance 10 starts operating according to the operation instruction (Step S104). After completion of the operation, the home appliance 10 notifies the operating terminal 60 of the completion of the operation (Step S414). Specifically, the home appliance 10 transmits to the device adapter 20 a signal indicating that the remote control operation is complete. Then, the device adapter 20 notifies the controller 30 of the completion of the remote control (Step S415), and the controller 30 in turn notifies the server 50 of the completion of the remote control (Step S416).

Figure 11:
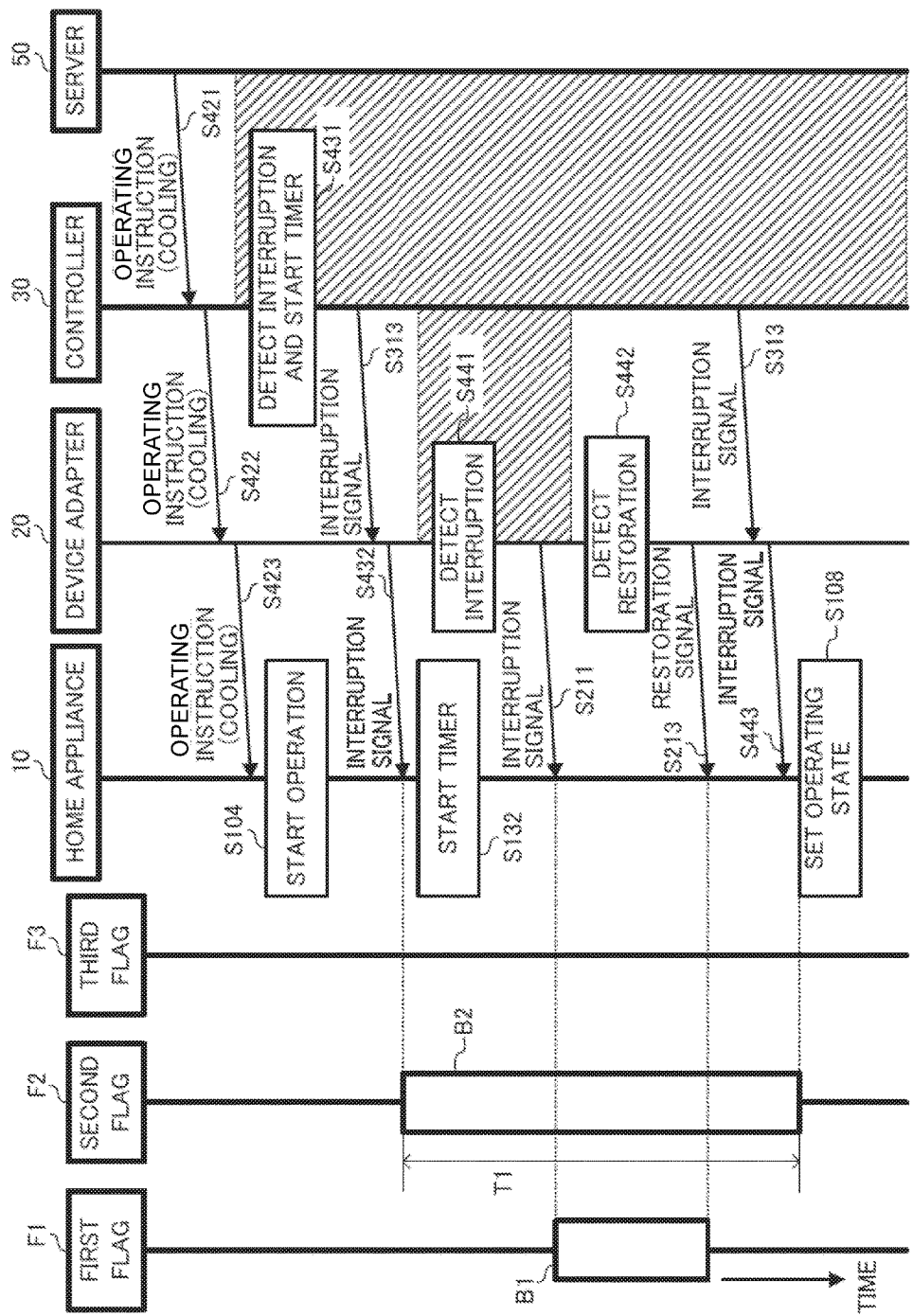
FIG. 11 is a diagram illustrating an example in which the communication interruption has occurred.

Subsequently, an event that the communications on the communication lines 42 and 43 are interrupted is described with reference to FIG. 11. The period of time during the communication interruption is indicated by a hatched area in the sequence diagram of FIG. 11. FIG. 11 also illustrates states of the first flag F1, the second flag F2, and the third flag F3. In FIG. 11, a box B1 indicates a period of time during which the first flag F1 is ON, whereas a box B2 indicates a period of time during which the second flag F2 is ON.

In an example illustrated in FIG. 11, the server 50 transmits the operation instruction to cause the home appliance 10 to perform cooling operation (Step S42). The controller 30 transmits the operation instruction to the device adapter 20 (Step S422), and the device adapter 20 in turn transmits the operation instruction to the home appliance 10 (Step S423). The home appliance 10 starts operating according to the operation instruction (Step S104).

Here, when the communication on the communication line 43 is interrupted, the controller 30 detects the communication interruption and starts the timer 33 (Step S431). The detection of the interruption corresponds to the negative determination in Step S308 (see FIG. 9). In addition, the start of the timer 33 corresponds to the start of the timer 33 in Step S312.

Then, when the communication interruption on the communication line 43 continues, the controller 30 repeatedly transmits, at 30 minute intervals, the interruption signal indicating a duration of the communication interruption (Step S313). Then, the device adapter 20 transmits, to the home appliance 10, the interruption signal transmitted from the controller 30 (Steps S432 and S443). Since the interruption signal transmitted in Step S432 is transmitted with the start of the timer 33, the duration of the communication interruption on the communication line 43 indicates zero minutes.

Upon receiving the interruption signal from the controller 30, the home appliance 10 sets the second flag F2 to ON and starts the timer 13 (Step S132). The setting of the second flag F2 and the start of the timer 13 are executed at the same time.

The length of the time that is measured by the timer 13 is thus equal to that of the time during which the second flag F2 is ON.

Then, when the communication on the communication line 42 is interrupted, the device adapter 20 detects the communication interruption (Step S441). The detection of this interruption corresponds to the negative determination in Step S210 (see FIG. 8). Then, the device adapter 20 transmits, to the home appliance 10, the interruption signal indicating the communication interruption on the communication line 42 (Step S211).

The home appliance 10 sets the first flag F1 to ON upon receiving the interruption signal from the device adapter 20. Here, since the timer 13 already measures the time, the control unit 11 of the home appliance 10 neither restarts nor resets the timer 13. Thus, the timer 13 keeps measuring the time elapsed from the time when the step S132 is executed.

Then, when the communication on the communication line 42 is restored, the device adapter 20 detects the restoration of this communication (Step S442). This detection of the restoration corresponds to the affirmative determination in Step S212 (see FIG. 8). Then, the device adapter 20 transmits the restoration signal to the home appliance 10 (Step S213).

The home appliance 10 sets the first flag F1 to OFF when receiving the restoration signal from the device adapter 20. Here, since the second flag F2 is subsequently ON, the control unit 11 of the home appliance 10 neither stops nor resets the timer 13. Thus, the timer 13 keeps measuring the time elapsed from the time when the step S132 is executed.

When the time during which the second flag F2 is ON is longer than a preset time T1, the home appliance 10 is set to the operating state (Step S108). Specifically, when the time measured by the timer 13 exceeds the time T1, the home appliance 10 changes the operation mode from the cooling operation to the inactive state (standby state).

As described above, the remote control system 100 according to the present embodiment changes the operating state of the home appliance 10 in accordance with a duration of the communication interruption on any one of the communication lines 41 to 43. When the communication interruption continues, the home appliance 10 is thus kept from keeping operating according to the operation instruction prior to the interruption. This also allows the home appliance 10 to be properly managed. Specifically, the home appliance 10 can improve safety or contribute to preventing waste of energy.

In addition, as illustrated in FIG. 5, the home appliance 10 changes the operating state only when the home appliance 10 is operated according to the operation instruction via the device adapter 20 and the controller 30. In a situation, for example, where the user U2 in the home H1 directly operates the home appliance 10, the operating state of the home appliance 10 does not automatically change independently of the intention of the user U2. This does not hinder convenience when the home appliance 10 is used in the home H1.

In addition, the home appliance 10 changes the operating state to a preset target state when the time measured by the timer 13 exceeds the threshold. The home appliance 10 can thereby determine, with a simple comparison operation, whether to change the operating state, and use the state read from the storage 12 as the target state. Thus, the hardware resources of the home appliance 10 can be saved.

The device adapter 20 repeatedly transmits test signals to the controller 30 and determines whether there is a response of the controller 30 to the test signals to detect the communication interruption on the communication line 42 (active detecting function). The device adapter 20 thereby reliably detects the communication interruption on the communication line 42.

The controller 30 relays the transmission of the operation instruction only when the device adapter 20 has an active detecting function. This prevents the operation instruction from being transmitted to the home appliance 10 via the device adapter 20 that is incapable of detecting the communication interruption on the communication line 42. In other words, this avoids the occurrence of the situation in which the timer 13 of the home appliance 10 does not start despite the communication on the communication line 42 being interrupted.

The controller 30 repeatedly transmits, to the home appliance 10, the interruption signal indicating a duration of the communication interruption on the communication line 43 (time notifying function). The home appliance 10 then changes the operating state of the home appliance 10 in accordance with the time indicated by this interruption signal. This eliminates the need for the home appliance 10 to measure the duration of the communication interruption on the communication line 43, thus allowing the configuration of the home appliance 10 to be simplified.

The device adapter 20 relays the transmission of the operation instruction only when the controller 30 has the time notifying function. This prevents the operation instruction from being transmitted to the home appliance 10 in a situation where the duration of the communication interruption on the communication line 43 cannot be measured. In other words, this prevents the home appliance 10 from keeping operating according to the operation instruction despite the communication interruption on the communication line 43 continuing at least for a certain period of time.

The home appliance 10 uses the single timer 13 to measure the duration of the communication interruption on at least one of the communication lines 41 to 43. This allows the home appliance 10 to have smaller scale configuration to simplify the processing of the home appliance 10 as compared with the situation where timers corresponding to the respective communication lines 41 to 43 are used.

In addition, the home appliance 10 and the device adapter 20 complete the start-up sequence before the device adapter 20 and the controller 30 perform the connection sequence. The communication on the communication line 42 is thus established only when the communication on the communication line 41 is established. This thus avoids the situation where, immediately after the construction of the remote control system 100, the communication on the communication line 42 is established although the communication on the communication line 41 is interrupted. Therefore, the communication line with the communication interrupted is easily identified.

Embodiment 2

Subsequently, Embodiment 2 is described mainly with a focus on differences from Embodiment 1 as described above. Components that are identical or equivalent to Embodiment 1 as described above are given like numerals, and the descriptions thereof are omitted or simplified.

A remote control system 100 of Embodiment 2 is different from that of Embodiment 1 in that a controller 30 has a periodic transmission function. The periodic transmission function is a function of periodically transmitting periodic signals to a device adapter 20. The periodic signals are transmitted, for example at 10 second intervals. The periodic signals are used by the device adapter 20 to detect a communication interruption on the communication line 42.

FIG. 12 illustrates adapter processing according to the present embodiment. As illustrated in FIG. 12, when the determination in Step S205 is affirmative (Step S205; Yes), a communication establishing module 21a inquires of the controller 30 whether the controller 30 has the time notifying function and the periodic transmission function (Step S501).

Then, the communication establishing module 21a determines, based on a response of the controller 30, whether the controller 30 has both the time notifying function and the periodic transmission function (Step S502). When the communication establishing module 21a determines that the controller 30 does not have the time notifying function or the periodic transmission function (Step S502; No), the control unit 21 causes the processing to proceed to Step S203.

When the communication establishing module 21a determines that the controller 30 has both the time notifying function and the periodic transmission function (Step S502; Yes), the control unit 21 starts relay processing for the operation instruction (Step S208).

Then, a detecting module 21b determines whether a communicator 26 receives a periodic signal from the controller 30 (Step S503). When the detecting module 21b determines that the communicator 26 does not receive the periodic signal (Step S503; No), the detecting module 21b determines whether a certain period of time has elapsed since the last reception of the periodic signal by the communicator 26 (Step S504). This certain period of time is, for example, 30 seconds.

When the detecting module 21b determines that the certain period of time has yet to elapse (Step S504; No), the detecting module 21b repeats the processing from Step S503. When the detecting module 21b determines that the certain period of time has elapsed (Step S504; Yes), the detecting module 21b determines that the communication on the communication line 42 is interrupted, and transmits an interruption signal to a home appliance 10 (Step S211). Then, the detecting module 21b repeats the processing from Step S503.

When detecting module 21b determines that the communicator 26 receives the periodic signal in Step S503 (Step S503; Yes), the detecting module 21b determines whether this periodic signal is the first received signal after the transmission of the interruption signal (Step S506). When the determination in Step S506 is negative (Step S506; No), the detecting module 21b repeats the processing from Step S503.

When the determination in Step S506 is affirmative (Step S506; Yes), the detecting module 21b determines that the communication on the communication line 42 is restored, and transmits a restoration signal to the home appliance 10 (Step S213). Then, the detecting module 21b repeats the processing from Step S503.

Subsequently, the communication among the home appliance 10, the device adapter 20, the controller 30, and the server 50 according to the present embodiment is described hereinafter with reference to FIG. 13. The sequence diagram of FIG. 13 illustrates an example in which the device adapter 20 detects a communication interruption on the communication line 42.

As illustrated in FIG. 13, the controller 30 periodically transmits periodic signals to the device adapter 20 (Step S601). The device adapter 20 can thereby monitor whether the communication on the communication line 42 is interrupted.

Then, when the reception of the periodic signal is interrupted, the device adapter detects the communication interruption on the communication line 42 (Step S602). Specifically, the device adapter 20 determines that the communication is interrupted when time T2 has elapsed since the time of receiving the last periodic signal without reception of the next periodic signal.

As described above, the controller 30 according to the present embodiment periodically transmits periodic signals (periodic transmission function). Then, the device adapter 20 determines whether there is the periodic signal to detect the communication interruption on the communication line 42. The device adapter 20 thereby reliably detects the communication interruption on the communication line 42.

The device adapter 20 relays the transmission of the operation instruction only when the controller 30 has a periodic transmission function. This prevents the device adapter 20 from falsely detecting the communication interruption on the communication line 42 despite the communication on the communication line 42 being not interrupted.

Although the embodiments of the present disclosure have been described, the present disclosure is not limited to these embodiments.

For example, techniques by which the controller 30 detects the communication interruption on the communication line 43 are not limited to the above embodiments. For example, when the server 50 has the periodic transmission function, the controller 30 may detect the communication interruption, similarly to the detection by the device adapter 20 according to Embodiment 2.

In addition, the transmission of the operation instruction as in the above embodiments is, but not limited to, the transmission via the server 50. For example, an operating terminal 60 transmits the operation instruction to the controller 30 without the interposed server 50. In addition, it is also contemplated that the remote control system 100 is constructed without the operating terminal 60. When the operating terminal 60 is omitted, the user U1 may directly enter the operation instruction into the controller 30.

In addition, in the above embodiments, the interruption signal transmitted by the device adapter 20 does not indicate the duration of the communication interruption on the communication line 42. However, the device adapter 20 may also transmit, to the home appliance 10, the interruption signal indicating the duration of the communication interruption, as with the controller 30.

In addition, the home appliance 10 may be manufactured integrally with the device adapter 20 or may incorporate the device adapter 20 therein.

The functions of the home appliance 10, the device adapter 20, and the controller 30 according to the embodiments as described above can be implemented by dedicated hardware or by a typical computer system.

For example, the programs P1 to P3 can be each stored and distributed on a computer readable recording medium, such as a compact disk read-only memory (CD-ROM), a digital versatile disk (DVD), a magneto-optical disk (MO), or any other recording medium, and the distributed programs P1 to P3 can be each installed on a computer to provide a device capable of executing the above described processes.

In addition, the programs P1 to P3 may each be stored on a disk device or the like of a given server device on a communication network, such as the Internet or the like, to enable each program to be downloaded in the computer, for example by superimposing the program onto a carrier wave.

In addition, the above described processes can be achieved by starting up and executing each of the programs P1 to P3 while the programs are transferred via the network, such as the Internet or the like.

In addition, all or portions of each of the programs P1 to P3 can be executed on a server device and the computer can execute each of the programs P1 to P3 while transmitting and receiving information involved in the processes via the communication network to achieve the above described processes.

When the above described functions are implemented, for example, to be shared by an operating system (OS) or in cooperation with an application, the programs except for the portions shared by the OS are stored and distributed on the medium or downloaded in the computer.

In addition, means for implementing the functions of the home appliance 10, the device adapter 20, and the controller 30 is not limited to software, but a portion or all thereof is implemented by dedicated hardware (circuits and the like). For example, the communication establishing module 21a and the detecting module 21b of the device adapter 20 can be configured using a field programmable gate array (FPGA), an application specific integrated circuit (ASIC), or the like to improve power savings for the device adapter 20.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The remote control system, the home appliance, the relay device, the appliance management method, and the program according to the present disclosure are suitable for remotely controlling appliances installed in a home.

REFERENCE SIGNS LIST

100 Remote control system
10 Home appliance
11, 21, 31 Control unit
11a, 21a, 31a Communication establishing module
11b, 21b, 31b Detecting module
11c State changing module
12, 22, 32 Storage
13, 23, 33 Timer
14, 34 Input device
15, 35 Output device
16 Communicator
20 Device adapter
26, 27 Communicator
30 Controller
36 Home communicator
37 External communicator
41, 42, 43 Communication line
50 Server
60 Operating terminal
B1, B2 Box
F1 First flag
F2 Second flag
F3 Third flag
H1 Home P1, P2, P3 Program
S401 Start-up sequence
S402 Connection sequence
S403 Authentication sequence
U1, U2 User

The invention claimed is:

1. A remote control system, comprising:

a home appliance; and a relay device configured to relay transmission of an operation instruction to remotely control the home appliance, the home appliance comprising:

a first detector configured to detect a first communication interruption on a first communication line for transmission of the operation instruction from the relay device to the home appliance;

a receiver configured to receive, from the relay device, an interruption signal indicating a second communication interruption on a second communication line for transmission of the operation instruction from a communication device to the relay device; and a state changer configured to change an operating state of the home appliance to a preset operating state (i) in a first situation that a duration of the first communication interruption exceeds a predetermined threshold, and (ii) in a second situation that a duration of the second communication interruption exceeds the predetermined threshold, the relay device comprising:

a second detector configured to detect the second communication interruption on the second communication line; and a transmitter configured to transmit the interruption signal to the home appliance when the second communication interruption is detected by the second detector.

2. The remote control system according to claim 1, wherein the state changer changes the operating state of the home appliance to the preset operating state when the duration of at least one of the first communication interruption and the second communication interruption exceeds the predetermined threshold only when the home appliance is operated according to the operation instruction transmitted via the relay device.

3. The remote control system according to claim 1, wherein the home appliance further comprises a measurer configured to measure, using a single timer, the duration of at least one of the first communication interruption and the second communication interruption, and the state changer changes the operating state of the home appliance in accordance with the duration measured by the measurer.

4. The remote control system according to claim 1, wherein the home appliance further comprises a first measurer configured to measure the duration of the first communication interruption, the relay device further comprises a second measurer configured to measure the duration of the second communication interruption, the transmitter repeatedly transmits the interruption signal indicating the duration measured by the second measurer, and the state changer changes the operating state of the home appliance in accordance with at least one of the duration measured by the first measurer and the duration indicated by the interruption signal.

5. The remote control system according to claim 1, wherein a control command for controlling the home appliance is transmitted through the second communication line as an operation instruction, the control command generated by the communication device, and the relay device is an adapter for connection of the home appliance to the communication device.

6. The remote control system according to claim 1, wherein an operating signal indicating details of an operation is transmitted through the second communication line as an operation instruction, and the relay device generates the control command for controlling the home appliance based on the details of the operation indicated by the operating signal, and transmits, as the operation instruction, the control command to the home appliance.

7. The remote control system according to claim 1, wherein the second detector detects the second communication interruption on the second communication line by repeatedly transmitting a test signal to the communication device and determining whether there is a response of the communication device to the test signal.

8. The remote control system according to claim 1, wherein the second detector detects the second communication interruption on the second communication line by determining whether there is a periodic signal transmitted periodically by the communication device.

9. The remote control system according to claim 8, wherein the relay device inquires of the communication device whether the communication device is capable of transmitting the periodic signal, and relays the transmission of the operation instruction only when acquiring a response that the communication device is capable of transmitting the periodic signal.

10. The remote control system according to claim 1, wherein the relay device inquires of the communication device whether the communication device is capable of notifying, to the home appliance or the relay device, a duration of a third communication interruption on a third communication line for transmission of the operation instruction from an external device to the communication device, and relays the transmission of the operation instruction only when acquiring a response that the communication device is capable of notifying the duration.

11. A home appliance configured to be remotely controlled according to an operation instruction transmitted via a relay device, the home appliance comprising:

a first detector configured to detect a first communication interruption on a first communication line for transmission of the operation instruction from the relay device to the home appliance;

a receiver configured to receive, from the relay device, an interruption signal indicating a second communication interruption on a second communication line for transmission of the operation instruction from a communication device to the relay device; and a state changer configured to change an operating state of the home appliance to a preset operating state (i) in a first situation that a duration of the first communication interruption exceeds a predetermined threshold, and (ii) in a second situation that a duration of the second communication interrupts exceeds the predetermined threshold.

12. The relay device for relaying the transmission of the operation instruction for remotely controlling the home appliance according to claim 11, the relay device comprising:

a second detector configured to detect the second communication interruption on the second communication line for transmission of the operation instruction from the communication device to the relay device; and a transmitter configured to transmit, to the home appliance, the interruption signal indicating the second communication interruption on the communication line when the second communication interruption is detected by the second detector.

13. An appliance management method for managing a home appliance to be remotely controlled according to an operation instruction transmitted via a relay device, the method comprising:

detecting a first communication interruption on a first communication line for transmission of the operation instruction from the relay device to the home appliance;

detecting a second communication interruption on a second communication line for transmission of the operation instruction from a communication device to the relay device;

transmitting an interruption signal from the relay device to the home appliance, the interruption signal indicating the second communication interruption; and changing an operating state of the home appliance to a preset operating state(i) in a first situation that a duration of the first communication interruption exceeds a predetermined threshold, and (ii) in a second situation that a duration of the second communication interruption exceeds the predetermined threshold.

14. A non-transitory computer-readable recording medium storing a program, the program causing a computer, installed in a home and remotely controlled according to an operation instruction transmitted via a relay device, to function as:

a detector configured to detect a first communication interruption on a first communication line for transmission of the operation instruction from the relay device to the computer;

a receiver configured to receive, from the relay device, an interruption signal indicating a second communication interruption on the second communication line for transmission of the operation instruction from a communication device to the relay device; and a state changer configured to change an operating state of the computer to a preset operating state (i) in a first situation that a duration of the first communication interruption exceeds a predetermined threshold, and (ii) in a second situation hat a duration of the second communication interruption exceeds the predetermined threshold.

* * * * *